INVENTOR.
MILTON H. STREETER

July 21, 1959 M. H. STREETER 2,895,303
PURIFICATION OF LOW-BOILING GASES
Filed May 17, 1956 3 Sheets-Sheet 2

INVENTOR.
MILTON H. STREETER
BY
Bernie A. Leyper
ATTORNEY

2,895,303

PURIFICATION OF LOW-BOILING GASES

Milton H. Streeter, South Sudbury, Mass., assignor to Arthur D. Little, Inc., Cambridge, Mass., a corporation of Massachusetts Application May 17, 1956, Serial No. 585,493

7 Claims. (Cl. 62—12)

This invention relates to the purification of gases and more particularly to gases which liquefy at low temperatures.

In liquefying such gases, and particularly in liquefying helium, it is necessary to use as pure gas as can be provided, in order to obtain the low temperature of the pure liquid and to avoid plugging the liquefying apparatus with solidified impurities. Impurities to be removed are normally gases of higher boiling points. For example, the gaseous helium which boils off from liquid helium and which may be recovered for reuse may contain some air and hence is contaminated with such gases as nitrogen, oxygen, hydrogen and argon. Helium, which is to be recovered and purified after use for experimental purposes, may contain such contaminants in amounts sometimes up to as much as 50%. The amount of impurities depends upon the efficiency of the recovery system.

Such gaseous impurities, along with any moisture, are commonly removed by passing the gas to be purified through one or more beds or pots of charcoal which are cooled with liquid nitrogen. When the charcoal in such beds or pots is fresh, gas impurities are adsorbed with relatively good efficiency, but these beds become easily plugged and the charcoal must be renewed often and the gas to be purified must be passed repeatedly over the charcoal. A further deterrent to the use of charcoal adsorption of gas impurities is the fact that there is no simple, inexpensive way of checking the purified gas for impurity content and hence no easy way to determine when the charcoal is plugged and must be renewed. The use of such an instrument as a mass spectograph to measure impurities, although an effective measuring means, is not available to many research workers. It is therefore desirable to provide a process and means for removing gas impurities from a gas which is efficient, reliable and easily operated. Purification of gases is accomplished by the process of this invention by freezing out the impurities in suitable heat exchange equipment.

It is therefore an object of this invention to provide a reliable and efficient means for removing gas impurities from a gas. It is another object to provide a system of gas purification with a continuous, reliable check on the purity of the gas. It is a further object of this invention to provide a simple heat exchange system suitable for freezing out gaseous impurities. These and other objects will be apparent from the following description of this invention.

In United States Patent 2,458,894, issued January 11, 1949, to Samuel C. Collins, there is disclosed a cycle for liquefying gases, particularly helium which has the lowest known boiling point, i.e., 4.2° K. or −268° C. The apparatus embodying this cycle is referred to as the helium cryostat. In order to attain the aforesaid low temperature, which is desirable for certain physical experimentations, the helium to be liquefied must be pure. Although the helium as obtained in pressure bottles is relatively pure, that which is recovered from liquid helium boil-off when the liquid helium is introduced into storage or experimental dewars is contaminated with air.

In the so-called helium cryostat, the cycle for which is the principal subject of United States Patent 2,458,894, an experimental chamber is provided within the heat exchange system. Additional heat exchange equipment designed to freeze out impurities in accordance with the present invention may be easily inserted into and withdrawn from this experimental chamber which has a temperature gradient from about room temperature to as low as liquid helium temperature (4.2° K.) Contaminated helium gas may be purified by passing it through this additional heat exchange equipment, which is described and claimed herein and which is hereinafter referred to as the purifying heat exchanger.

The purification of gases in accordance with this invention will be described in detail and with reference to the accompanying drawings in which—

Since helium liquefies at the lowest temperature of all gases, its purification presents the most extreme or difficult case. For this reason the process of this invention will be described in terms of purifying helium for illustrative, not limiting, purposes. The purifying heat exchanger of this system is adaptable to all the low-boiling gases such as hydrogen, argon, neon, oxygen, etc.

Figure 1:
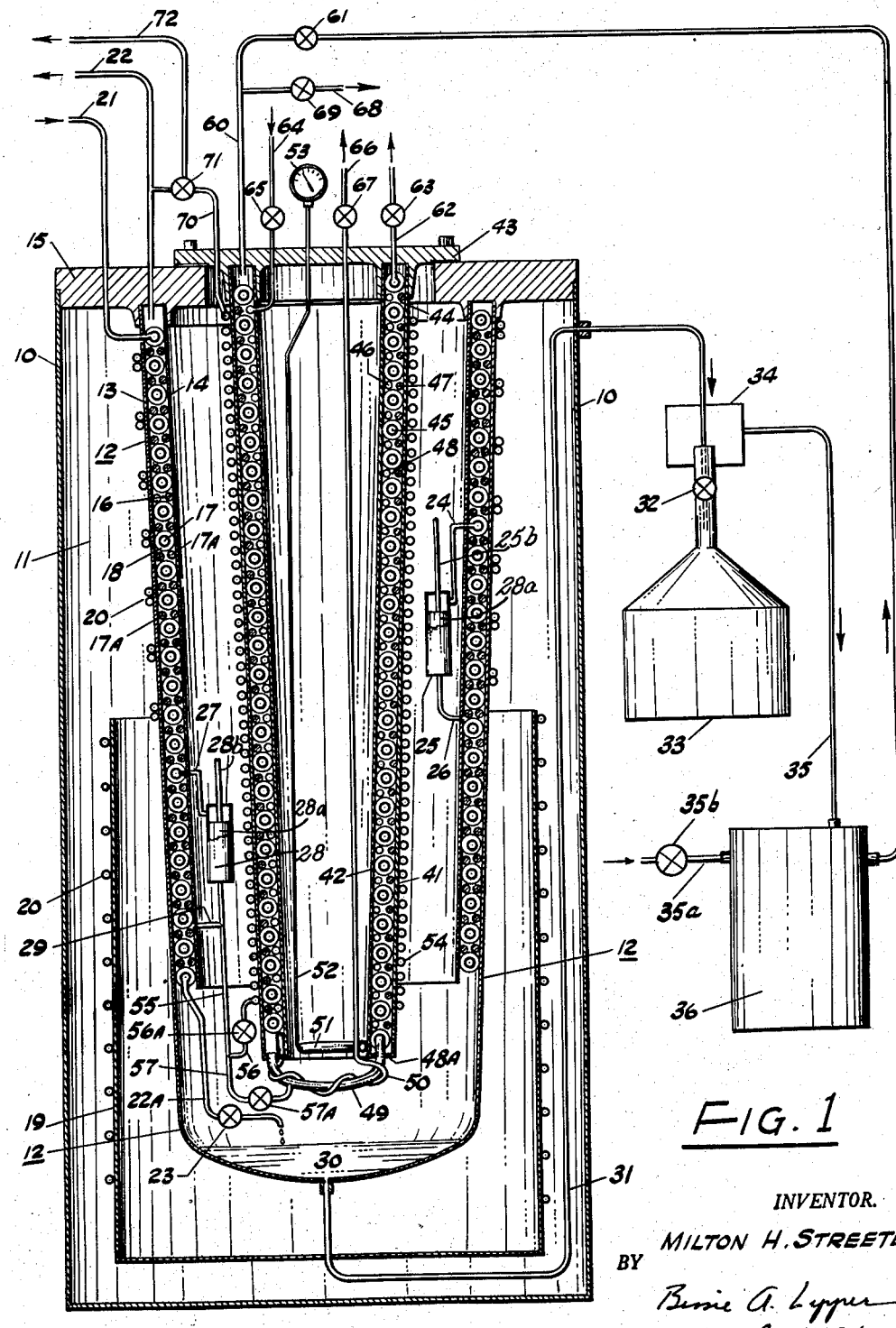
Fig. 1 is a simplified cross-sectional view through the heat exchanger system of the helium cryostat showing the gas purifying heat exchanger of this invention in place.

Fig. 1 is a cross-sectional view of the heat exchange system of the cryostat showing the purifying heat exchanger of this invention inserted in the experimental chamber area. Only those additional pieces of equipment within the cryostat heat exchanger which are connected to or have relationship to the purifying heat exchanger are shown. The various parts shown in Fig. 1 comprise first the cryostat heat exchanger which in turn is made up of an outer vacuum jacket 10 which forms an evacuatable area 11 around the dewar-type flask 12 which in turn holds the main heat exchange system made up of concentric circular walls 13 and 14. These walls 13 and 14 are suspended from flange 15, and they form a channel 16 in which finned tubing 17 is helically wound so as to leave a tortuous passage 18 around finned tubing 17 thus forming an out-of-contact heat exchange system, within the channel 16, between the passage 18 and the interior of tubing 17. Cord packing 17a is wound within passage 18 so as to touch the fins of finned tubing 17 and walls 13 and 14. This cord therefore serves to hold the finned tubing 17 firmly in place and to better direct the path of gas through passage 18. A radiation shield 19 surrounds the lower portion of dewar 12, and around the upper unsurrounded portion of the dewar and around the radiation shield 19 is wound tubing 20 to carry a precooling liquid. Line 21 leads into tubing 17, line 22 leads out of passage 18 while line 22a leads from the lower end of finned tubing 17 into a Joule-Thomson valve 23. Part-way down the cryostat heat exchanger line 24 connects finned tubing 17 with the intake of a first expansion engine 25, the output of which in turn is connected by means of line 26 to passage 18. Expansion engine 25 comprises a piston 28a and a piston rod 25b. Similarly, further down the cryostat heat exchanger, line 27 connects finned tubing 17 with the intake of a second expansion engine 28, the outlet of which is connected by means of line 29 to passage 18. Expansion engine 28 is of the same type as expansion engine 25, and comprises piston 28a and piston rod 28b. Dewar flask 12 is equipped with a draw-off line 31 controlled by valve 32, by means of which the liquefied gas 30 collected in the bottom of dewar flask 12 (i.e., the cold end) may be led to a storage vessel 33. Surrounding the neck of vessel 33 is a gas collector 34 having a line 35 leading to gas storage tank 36.

The purifying heat exchanger is suspended in the above-described cryostat heat exchanger. The purifying heat exchanger, in turn, is made up of concentric circular walls 41 and 42 affixed to and suspended from flange 43. The outer diameter of wall 41 is so designed that it fits closely in the opening of cryostat flange 15. Wound helically within the channel 44, formed by walls 41 and 42, are finned tubing 45, tubing 46 and a soft cord packing 47. A tortuous passageway 48 is thus formed around the fins of finned tubing 45. Finned tubing 45, tubing 46 and walls 41 and 42 are all of heat conductive metal and in good thermal contact with each other. These elements provide the tortuous passageway 48 and promote good heat exchange between the warm contaminated helium in passageway 48 and the cold purified helium in finned tubing 45. There is, in turn, also good heat exchange between the cold atmosphere surrounding the purifying heat exchanger and the contaminated helium in passageway 48.

Figure 3:
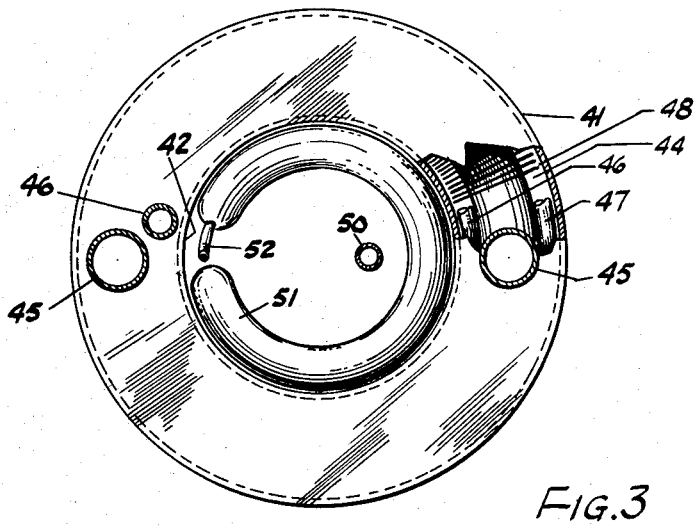
Fig. 3 is a cross-sectional view of the bottom portion of the purifying heat exchanger taken across line 3—3 of Fig. 2.
Figure 2:
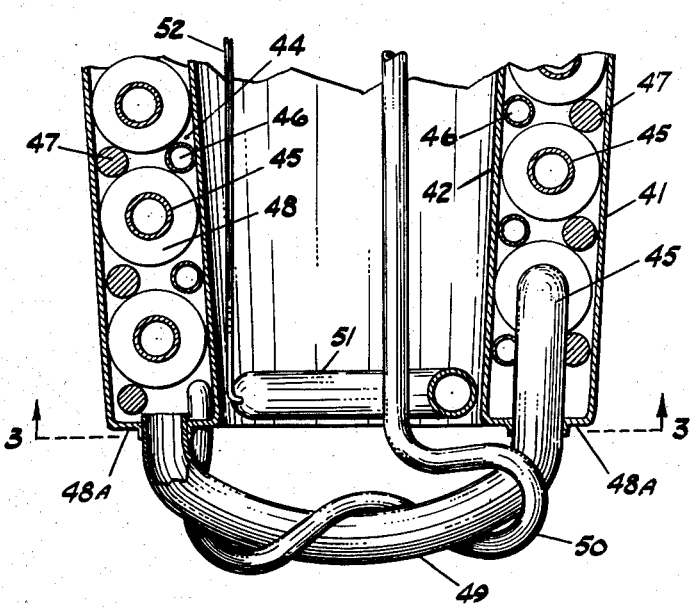
Fig. 2 is an elevation, with parts broken away and shown in section, of the bottom end of the purifying heat exchanger of this invention.

The lower or cold portion of the purifying heat exchanger is shown in detail in Figs. 2 and 3 in which like numbers correspond to like elements in Fig. 1. The end of the channel 44 is hermetically closed by bottom element 48a but has a connecting tubing 49, which connects the passageway 48 with the finned tubing 45. Likewise tubing 46 passes through the bottom 48a to join tubing 50 which is wound about connecting tubing 49 and then passes directly upward through the central portion of the purifying heat exchanger to valve 67 and line 66. Adjacent the bottom of the inner wall 42 is a circular helium gas thermometer 51 having a capillary tubing 52 leading out to a gage 53.

The purifying heat exchanger may be equipped with an auxiliary cooling system which comprises coil 54 wound around outside wall 41 and fed from branch line 55 leading from exhaust line 29 of the second expansion engine 28. Line 55 divides into two branches 56 and 57, the former controlled by valve 56a and leading to coil 54, and the latter controlled by valve 57a and leading to tubing 49. In actual practice, the handles (not shown) which operate valves 56a and 57a will be located outside of the chambers, and will communicate with these valves by stems of suitable length.

Line 60 controlled by valve 61 is provided for admitting impure gas into passageway 48 while line 62 controlled by valve 63 is provided for leading out the purified gas. Warm air line 64 controlled by valve 65 leads to tubing 46, and line 66 controlled by valve 67 leads out from tubing 50. Line 61 is provided with a branch line 68 controlled by valve 69 to permit removal of evaporated contaminants. Auxiliary cooling coil 54 discharges into line 70, and thence via three-way valve 71 into line 22 or through line 72 to any other desired location or use.

The operation of the cryostat heat exchanger cycle may first be described briefly, using helium as an example. Warm, high-pressure helium enters finned tubing 17 by means of line 21, and one portion of it is expanded in expansion engine 25 and returned as cool gas through passageway 18. Another portion is taken off by line 27 and expanded through engine 28 and returned to the cool side of the heat exchanger, i.e., passageway 18. A third portion is put through the Joule-Thomson valve 23, part of it being liquefied and stored as liquid 30. Cool, low-pressure helium returning through passage 18 leaves the heat exchanger by line 22. Due to the position of the purifying heat exchanger within the cryostat heat exchanger, the former is exposed to a temperature gradient, which in the case of helium amounts to a range of from about 4.2° K. at the bottom of the purifying heat exchanger to about room temperature at the point where walls 41 and 42 are fixed to flange 43. Cooling within the experimental chamber, which is the central portion of the area enclosed by wall 13, is therefore accomplished by conduction and convection in the lower part and primarily by convection in that area surrounded by the cryostat heat exchanger, i.e., the area defined by wall 14. It is usually found convenient, especially when a high rate of helium liquefaction is desired, to precool the dewar flask 12 by passing liquid nitrogen through tubing 20.

In the process of drawing off liquid helium by line 31 into the vessel 33, the boiled-off helium may become appreciably contaminated with other gas, and especially with air. The boiled-off contaminated helium is therefore drawn into collector 34 and may then be conveniently stored in storage tank 36 until such time as it is desired to put it through the purifying heat exchanger. Likewise, helium may be seriously contaminated while being used for experimental purposes and the resulting vaporized helium containing contaminants may be introduced into storage tank 36 by means of line 35a controlled by value 35b.

The cycle in the purifying heat exchanger may now be described in detail with reference to Figs. 1 through 3. Contaminated helium from storage tank 36 is introduced by means of line 60 into the passage 48 formed in channel 44. It passes in a winding path over the fins of finned tubing 45, and as it is forced downward it is cooled both by convection from the cryostat heat exchanger and by the cooled pure helium coming upwards through the finned tubing 45. By the time the helium, from which contaminants are to be removed, has reached the bottom portion of the purifying heat exchanger all, or substantially all, of the contaminants have been solidified or frozen out on the fins of finned tubing 45. At the bottom of the purifying heat exchanger (see Fig. 2) the now purified cold helium is carried from the passageway 48 by means of connecting tubing 49 into the finned tubing 45 so that the pure helium returns through the purifying heat exchanger within the tubing 45 and in doing so, cools the incoming impure helium. The purified helium is taken out by means of line 62 to be stored, or, if desired, to be sent through the cryostat heat exchanger in the cycle described above.

The purity of the helium at the bottom of the heat exchanger is continuously checked by means of the helium gas thermometer 51. This thermometer is a closed copper tubing, forming part of a circle, which is fitted in close contact within the inside of the bottom portion of the purifying heat exchanger. This tubing 51 has a capillary 52 which leads to a temperature-registering gage 53. By building up a known pressure in copper tubing 51 before the purifying cycle is begun, the temperature of the purified gas by the time it reaches connecting tubing 49 can be determined by the subsequent fall in pressure in copper tubing 51. The temperature of the purified gas is then a measure of the purity attained.

Since the contaminant gases, such as nitrogen, argon, etc., are removed by freezing out on the fins of tubing 45, means must be supplied to remove these frozen deposits periodically. Tubing 46 is incorporated for this purpose. Warm air, or any other warm fluid, may be introduced by means of line 64 into tubing 46, which directs the warm fluid down through the purifying heat exchanger and around connecting tube 49 by means of tubing 50, which is an extension of tubing 46. This tubing 50, after passing around connecting tubing 49, returns directly from the purifying heat exchanger through valve 67 to discharge the warming fluid either to the air or to other suitable points by means of line 66. During this warm-up cycle while the contaminants are being removed, the flow of impure helium will be cut off by closing valve 61. Valve 69, which remains closed during the purifying cycle, will be opened to allow the volatilized contaminant to leave the system by means of line 60 and thence, by line 68, to the open air or to any other suitable disposition point.

When the auxiliary cooling system is to be used, valve 56a is opened to allow a quantity of cooled helium from exhaust line 29 of expansion engine 28 to flow by means of lines 55 and 56 into auxiliary coil 54, or by opening valve 57a cold helium may be allowed to flow into connecting tube 49 by way of line 57. Thus cold helium from the second expansion engine 28 may be introduced into auxiliary coil 54, into connecting tubing 49, or into both. When cold helium is introduced into the connecting tube 49 to enter the cold side of the purifying heat exchanger care must be taken to maintain a small, but suitable, pressure differential between the incoming cold pure helium and the helium coming from passage 48 so that the pure helium is not forced back up through passage 48 to be mixed with the contaminated helium. Helium leaving the auxiliary cooling coils 54 of the purifying heat exchanger may be directed by means of valve 71 into line 22 which carries off the cold low pressure helium from the cryostat heat exchanger or it may be directed by means of line 72 to any other suitable point in the system.

Figure 4:
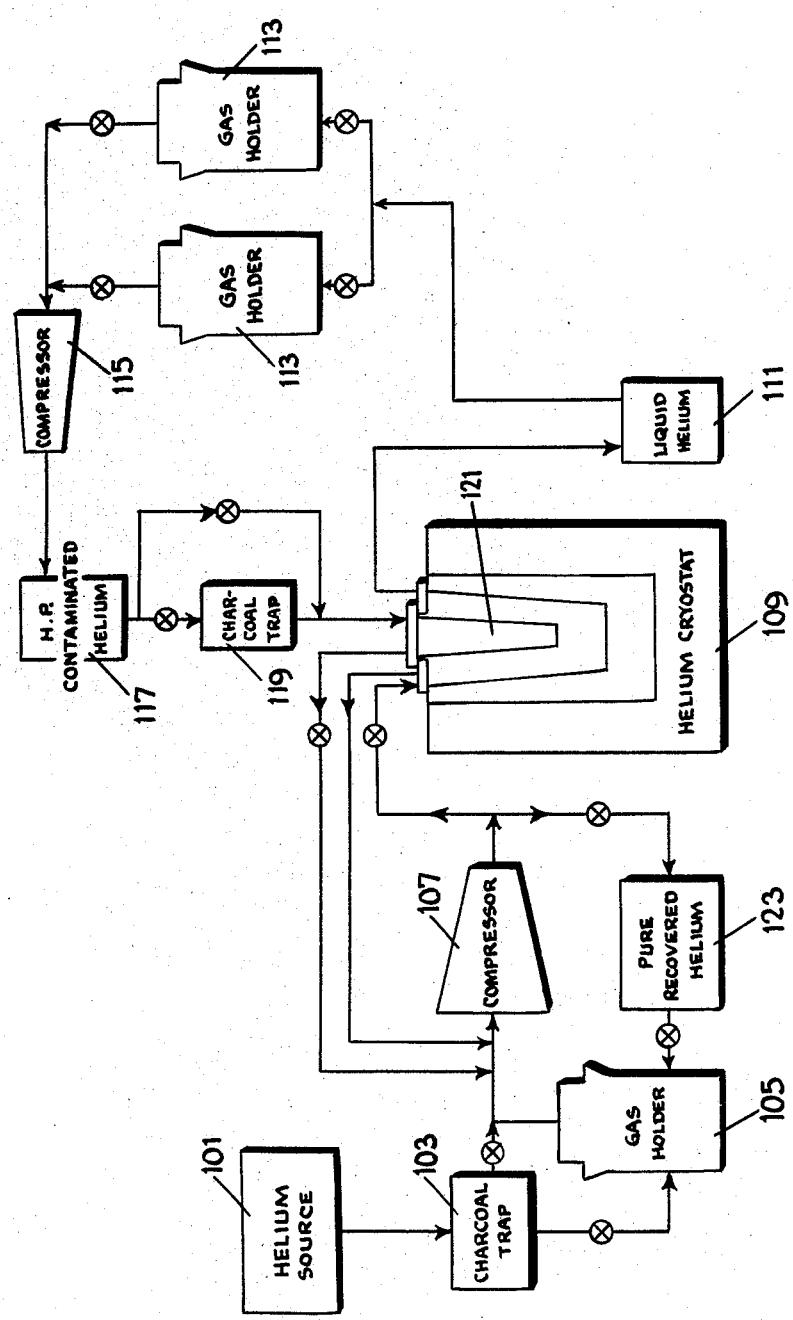
Fig. 4 is a flow diagram illustrating how the gas purifying system of this invention may be integrated in a helium cryostat.

Fig. 4 is a flow diagram showing one way in which the gas purifier of this invention may be incorporated into an over-all helium liquefying cycle. Pure helium is supplied from source 101 (usually pressurized gas bottles), is put through a charcoal trap 103, which is cooled with liquid nitrogen to remove moisture and minor impurities, collected in a gas holder 105 (which may be by-passed) and then compressed by one or more compressors 107. The warm pressurized helium is put through the usual helium heat exchanger of the helium cryostat 109, some being liquefied, the remainder returning to the compressor for recompression and reintroduction into cryostat 109. The liquid helium drawn off from cryostat 109 is stored in dewar 111, while the contaminated boiled-off gas is led to gas holders 113. This contaminated helium is compressed by compressor 115 and if desired stored as high-pressure helium in storage tank 117. Before entering the purifying heat exchanger of this invention, this contaminated helium may be put through charcoal trap 119 (cooled with liquid nitrogen) for a preliminary cleanup. This trap may, however, be omitted or by-passed. The high pressure contaminated helium is then purified by the purifying heat exchanger 121 inserted in the experimental chamber of cryostat 109 and the purified helium may be compressed and returned directly with the pure helium from source 101 to cryostat 109, or it may be compressed and stored in the recovered helium tank 123 for further use in the liquefying system as shown.

It will be seen from Fig. 4 that the purifying heat exchanger of this invention is easily integrated into a gas liquefying system and that recovery of contaminated helium gas is simple and economical. The ability to recover such gases as helium where they are not readily available and are expensive to procure is of vital importance to many low temperature research programs.

The use of the purifying heat exchanger of this invention in place of the normally used charcoal traps, results in a purifying process which is reliable and which has incorporated in it a means for continuously checking the purity attained.

I claim:

1. In a gas purifying heat exchanger designed to freeze out low-boiling gaseous contaminants, hermetically sealed concentric circular channel means having finned tubing helically wound therein, bridging conduit means connecting said channel means to said finned tubing at the cold end of said channel, means for conducting contaminated gas into said channel at the warm end thereof and containing valve means for controlling the flow of gas into said channel means, means for conducting the resulting purified gas from said finned tubing, means located within said channel means and in heat-exchange relationship with said finned tubing and with said bridging means for periodically warming said finned tubing and said bridging means whereby low-boiling gaseous contaminants deposited as solids on said finned tubing are volatilized and removed from said channel means, and means for maintaining the temperature of the atmosphere surrounding at least the area of said cold end of said heat exchanger at a temperature below the freezing points of said contaminants and above the freezing point of said purified gas.

2. Apparatus in accordance with claim 1 wherein said means for maintaining the temperature around said purifying heat exchanger comprises a dewar surrounding said purifying heat exchanger and containing therein means for liquefying helium, said means for liquefying helium comprising heat exchanger means and expansion engine means.

3. In a gas purifying heat exchanger designed to freeze out low-boiling gaseous contaminants, hermetically sealed concentric circular channel means having finned tubing helically wound therein, bridging conduit means connecting said channel means to said finned tubing at the cold end of said channel, means for conducting contaminated gas into said channel at the warm end thereof and containing valve means for controlling the flow of gas into said channel means, means for conducting the resulting purified gas from said finned tubing, tubing means wound parallel and adjacent to said finned tubing within said channel means, around said bridging conduit means and extending through the central portion of said purifying heat exchanger, means for periodically conducting a warm fluid through said tubing means, and means for maintaining the temperature of the atmosphere surrounding at least the area around said cold end of said heat exchanger at a temperature below the freezing points of said contaminants and above the freezing point of said purified gas.

4. In a gas purifying heat exchanger designed to freeze out low-boiling gaseous contaminants, hermetically sealed concentric circular channel means having finned tubing helically wound therein, bridging conduit means connecting said channel means to said finned tubing at the cold end of said channel, means for conducting contaminated gas into said channel at the warm end thereof and containing valve means for controlling the flow of gas into said channel means, means for conducting the resulting purified gas from said finned tubing, tubing means wound parallel and adjacent to said finned tubing within said channel means, around said bridging conduit means and extending through the central portion of said purifying heat exchanger, means for periodically conducting a warm fluid through said tubing means, gas thermometer means for measuring the temperature of said purified gas at the bottom of and abutting a major portion of the inside inner wall of said circular channel means of said purifying heat exchanger, and means for maintaining the temperature of the atmosphere surrounding at least the area around said cold end of said heat exchanger at a temperature below the freezing points of said contaminants and above the freezing point of said purified gas.

5. Apparatus in accordance with claim 4 wherein said means for maintaining the temperature around said purifying heat exchanger comprises a dewar surrounding said purifying heat exchanger and containing therein means for liquefying helium, said means for liquefying helium comprising heat exchange means and expansion engine means.

6. In a gas purifying heat exchanger designed to freeze out low-boiling gaseous contaminants, hermetically sealed concentric circular channel means having finned tubing helically wound therein, bridging conduit means connecting said channel means to said finned tubing at the cold end of said channel, means for conducting contaminated gas into said channel at the warm end thereof, means for conducting the resulting purified gas from said finned tubing, tubing means wound parallel and adjacent to said finned tubing within said channel means, around said bridging conduit means and extending through the central portion of said purifying heat exchanger, means for periodically conducting a warm fluid through said tubing means, gas thermometer means for measuring the temperature of said purified gas at the bottom of and abutting a major portion of the inside inner wall of said circular channel means of said purifying heat exchanger, means for maintaining the temperature of the atmosphere surrounding at least the area around said cold end of said heat exchanger at a temperature below the freezing points of said contaminants and above the freezing point of said purified gas, and auxiliary tubing means wound helically around the outside of said channel means and connecting tubing means between a source of cold pure gas identical in composition to said purified gas.

7. Process for purifying a low-boiling gas, comprising a first and a second period of operation, said first period comprising the steps of introducing the gas to be purified at substantially room temperature into the upper portion of a sealed heat exchanger having out-of-contact warm and cold sides, maintaining a temperature gradient surrounding said heat exchanger ranging from substantially room temperature at the top to a temperature slightly below the boiling point at atmospheric pressure of said gas at the bottom, forcing said impure gas downwardly through said heat exchanger on said warm side to freeze out the impurities in the process of cooling said gas, drawing off the resulting cold purified gas from the bottom portion of said heat exchanger, introducing said purified gas into said cold side of the bottom of said heat exchanger and removing said purified gas from the upper portion of said heat exchanger, said second period comprising the steps of shutting off the supply of said gas and warming up said heat exchanger to vaporize the gaseous contaminants deposited therein as solids, said first period and said second period being alternated one with the other.

References Cited in the file of this patent

UNITED STATES PATENTS

| | | |
|---|---|---|
| 620,312 | Hampson | Feb. 28, 1899 |
| 783,045 | Johnson | Feb. 21, 1905 |
| 795,525 | Linde | July 25, 1905 |
| 815,601 | Linde | Mar. 20, 1906 |
| 927,594 | Place | July 13, 1909 |
| 1,027,862 | Linde | May 28, 1912 |
| 1,961,203 | De Baufre | June 5, 1934 |
| 1,962,176 | De Baufre | June 12, 1934 |
| 2,151,299 | Miller | Mar. 21, 1939 |
| 2,160,898 | Peff | June 6, 1939 |
| 2,386,297 | Dennis | Oct. 9, 1945 |
| 2,529,516 | Scheibel | Nov. 14, 1950 |
| 2,585,912 | Buschow | Feb. 19, 1952 |